United States Patent [19]

Gerszberg

[11] Patent Number: 5,297,192
[45] Date of Patent: Mar. 22, 1994

[54] METHOD AND APPARATUS FOR REMOTELY PROGRAMMING A MOBILE DATA TELEPHONE SET

[75] Inventor: Irwin Gerszberg, Lakewood, N.J.

[73] Assignee: AT&T Bell Laboratories, Murray Hill, N.J.

[21] Appl. No.: 85,248

[22] Filed: Jun. 30, 1993

Related U.S. Application Data

[63] Continuation-in-part of Ser. No. 914,011, Jul. 15, 1992, abandoned, which is a continuation of Ser. No. 590,411, Sep. 28, 1990, abandoned.

[51] Int. Cl.$^5$ .......................................... H04M 11/00
[52] U.S. Cl. ...................................... 379/59; 379/58; 379/63
[58] Field of Search ...................... 379/58, 59, 62, 63; 455/33.1

[56] References Cited

U.S. PATENT DOCUMENTS

| | | | |
|---|---|---|---|
| 4,817,190 | 3/1989 | Comroe et al. | 379/63 |
| 4,833,701 | 5/1989 | Comroe et al. | 379/60 |
| 4,860,336 | 8/1989 | D'Avello et al. | 379/63 |
| 4,864,599 | 9/1989 | Saegusa et al. | 379/62 |
| 5,046,082 | 9/1991 | Zicker et al. | 379/63 |
| 5,109,403 | 4/1992 | Sutphin | 379/59 |

FOREIGN PATENT DOCUMENTS

| | | |
|---|---|---|
| 0301573 | 1/1989 | European Pat. Off. |
| 0332825 | 9/1989 | European Pat. Off. |
| 0054636 | 2/1990 | Japan ................................... 379/63 |
| 2249459 | 6/1992 | United Kingdom. |

OTHER PUBLICATIONS

WPIL Abstract, European Patent Office, 92-124707, "Remotely programmable DTMF radiotelephone", Hardin et al.
"Portable Communication" by P. E. Jackson et al, Proceedings of the National Communications Forum, Sep. 1988, pp. 1706-1712.
WO87/01537, World Intellectual Property Organization, Mar. 12, 1987.

*Primary Examiner*—Wing F. Chan
*Assistant Examiner*—Dwayne D. Bost
*Attorney, Agent, or Firm*—Alfred G. Steinmetz

[57] ABSTRACT

Downloading of number assignment module designation parameters into a memory circuit of a mobile data telephone set utilizes the built-in voice band modem of the set so that service authorization codes and activation can be entered remotely into the subscriber's set thereby initiating cellular service or changing the type of service provided. As described, a cellular mobile subscriber first calls a remote cellular service provider center to establish a voice communication channel between the set and the center. Next, the modem of the set is selectively bridged onto the voice communication channel to achieve data transfer between a source of data located at the remote center and the subscriber's modem. The foregoing enables the remote programming of subscriber's authorization and information into the memory circuit of the mobile data telephone set.

4 Claims, 3 Drawing Sheets

METHOD AND APPARATUS FOR REMOTELY PROGRAMMING A MOBILE DATA TELEPHONE SET

This application is a continuation-in-part of application Ser. No. 07/914,011, filed on Jul. 15, 1992, which was a continuation of Ser. No. 07/590,411, filed Sep. 28, 1990, both abandoned.

RELATED APPLICATIONS

This application relates to my copending U.S. patent application Ser. No. 07/590,409 filed on Sep. 28, 1990, entitled "Method and Apparatus for Remotely Programming a Wireless Telephone Set" which is assigned to the assignee herein, and to the U.S. patent application of F. Barzegar et al., Ser. No. 07/566,733 filed on Aug. 13, 1990, entitled "Mobile Data Telephone" which is assigned to the assignee herein.

TECHNICAL FIELD

The present invention generally relates to programming of mobile telephone sets and, more particularly, to a method and apparatus for remotely downloading Number Assignment Module (NAM) designation parameters into a mobile data telephone set.

BACKGROUND OF THE INVENTION

The use of cellular mobile telecommunications has undergone substantial growth over the past few years. Due to a growing customer base, cellular mobile telephone service providers and cellular mobile telephone service resellers are faced with serving an increased number of new subscribers demanding diversified cellular services which include voice and/or data communication. Also, a growing number of existing cellular mobile subscribers tend to switch back and forth between various voice and data service providers depending on the marketing and sales incentives offered by any one of such providers to newly signed-up cellular mobile subscribers. The foregoing shifts and variations in customer - supplier and customer - reseller relationships require programming, as well as reprogramming, of the cellular data telephone sets each time a customer subscriber desires a change.

Typically, cellular service providers require that any prospective customer take the cellular telephone set, after purchasing it, to an authorized service center for programming so that such telephone set becomes an authorized cellular service user set. In the case of cellular service resellers, prospective subscribers are often asked to send the telephone set, after purchasing it, to an authorized agent for programming. In either case, the procedure is cumbersome and costly to the customer, as well as to the provider or reseller, because delays are encountered prior to the start of service. Therefore, there exists a need for a method and an apparatus for programming mobile data telephone sets in a manner that quickly, reliably and cost-effectively provides voice and data service to new or existing customers.

SUMMARY OF THE INVENTION

The foregoing need is met in an illustrative embodiment wherein a method for programming a mobile data telephone set comprises the steps of establishing wireless bidirectional voice and data communication paths between the mobile data telephone set and a control center; activating the telephone set to enable transmission and reception of data to and from the control center over the voice communication path; receiving, over the voice communication path, a set of predetermined telecommunication service authorization coded signals allocated to the telephone set; and storing in the telephone set the received service authorization coded signals.

In accordance with another embodiment, a remotely programmable mobile data telephone set comprises means including a radio transceiver and a modem connected thereto for establishing wireless bidirectional voice and data communication paths between the mobile data telephone set and a control center, actuating means for selectively bridging the modem of the telephone set onto a voice communication path; means responsive to the actuating means for enabling the modem to receive, over the voice communication path, a set of predetermined service authorization signals allocated to the mobile data telephone set; and means for storing in the mobile data telephone set the received service authorization signals.

In accordance with a further embodiment, a method for remotely authorizing telecommunication service to a mobile data telephone set from a control center comprises the steps of establishing wireless bidirectional voice and data communication paths between the control center and the mobile data telephone set for transmitting and receiving data signals therebetween over the voice communication path; receiving, at the control center, predetermined identification indicia associated with the telephone set; and transmitting from the control center, over the voice communication path in response to the received identification indicia, telecommunication service authorization coded signals allocated to the telephone set.

In accordance with a particular illustrative embodiment of the invention, a mobile telephone set for transmitting and receiving voice and data signals over communications channels includes a radio transceiver, a modem connected to the radio transceiver; actuating means for selectively bridging the modem onto a voice communication channel; means responsive to the actuating means for enabling the modem into a data communication mode, via the transceiver, over the voice communication channel; means for receiving service authorization codes associated with the mobile telephone set; and means for storing the received service authorization codes.

BRIEF DESCRIPTION OF THE DRAWING

Further features and advantages of the present invention will become apparent from the following detailed description taken together with the drawings in which.

DETAILED DESCRIPTION

Figure 1:
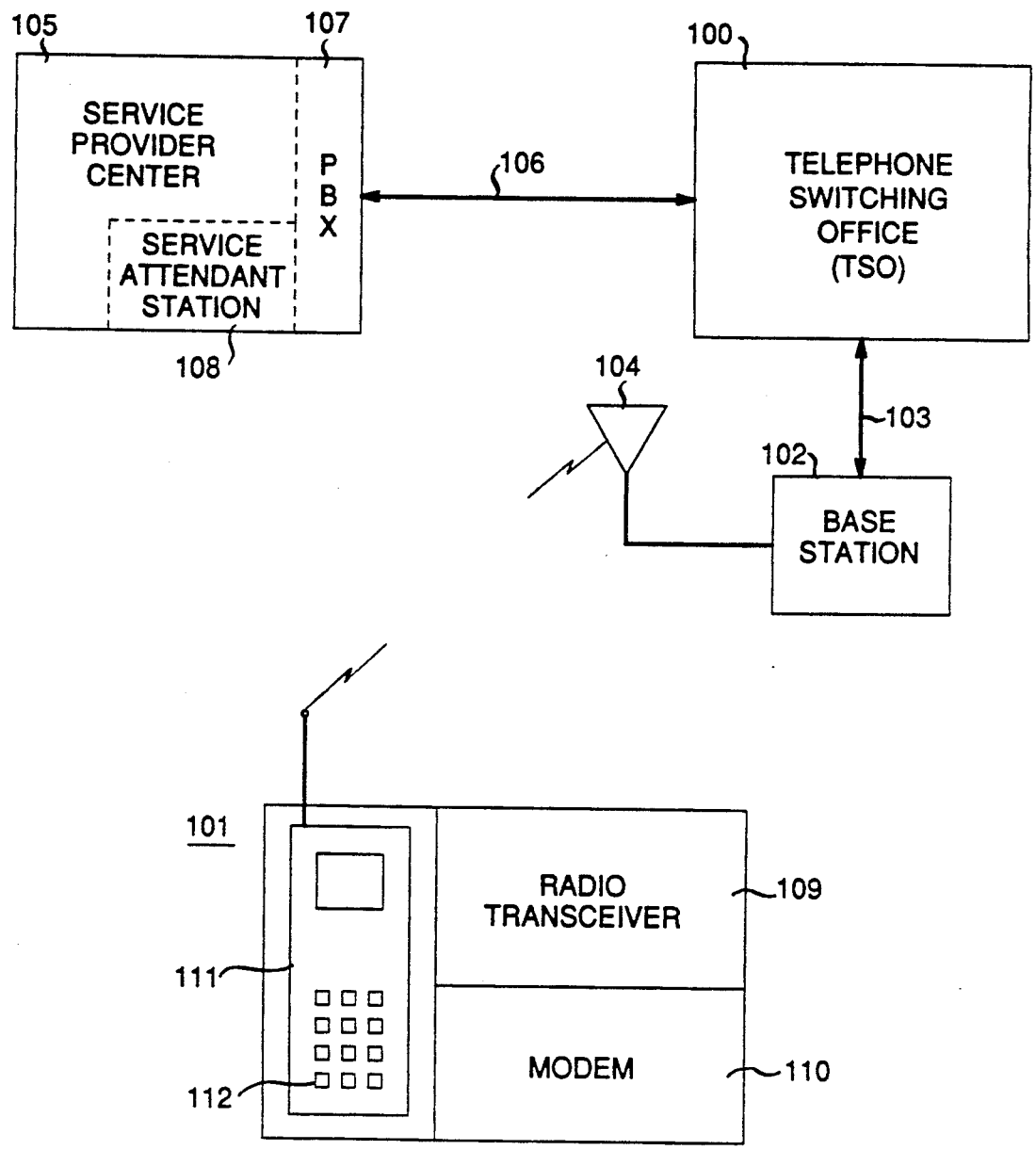
FIG. 1 is a schematic block diagram representation of a mobile data telephone communication configuration in accordance with an embodiment of the invention.

Shown in FIG. 1 is a schematic representation of a mobile data telephone communication configuration which illustratively includes a mobile telephone switching office (MTSO) 100 which is adapted to link a mobile data telephone set 101 into a regional or nationwide telephone network (not shown). A cellular base station 102, coupled to the MTSO 100, via a bidirectional voice and data communication link 103, is arranged to be in radio frequency communication with the mobile data telephone set 101 via a radio frequency antenna 104. Also shown in schematic form, is a cellular communications service provider center 105 adapted to be coupled to the MTSO 100 via another bidirectional voice and data link 106. The service provider center 105 includes, inter alia, a telephone private branch exchange (PBX) 107, and a service attendant station 108 coupled to the PBX 107. As shown, the mobile data telephone set 101 comprises a radio transceiver 109, a built-in modem 110, and a voice handset 111.

The principles and features of the present invention shall be hereafter described in connection with FIG. 1. Upon the purchase or lease of the mobile data telephone set 101, a prospective subscriber would be assigned by the vendor or lessor a valid mobile telephone number which typically would include an area or regional code number followed by a station number. In order for the subscriber to be able to use the mobile data telephone set 101, a telephone service provider or reseller, of the subscriber's choice, must authorize such use by programming the set 101 so that it is identifiable within the cellular communications' network as an authorized and legitimate cellular mobile service subscriber/user. Normally a mobile wireless telephone set, such as disclosed herein, may not initiate and complete radiotelephone calls until it is registered with an authorized for service by a service provided. All regular radiotelephone communication channels are blocked to unauthorized callers who are not registered and authorized for service. Virtually all service providers however do provide continuously unblocked service channels for permitting mobile wireless telephone sets to communicate with the service center without having prior registration and authorization. This is typically a 611 number and may be accessed by any handset whether it is presently authorized or not. The programming of the set 101 is achieved by having the subscriber dial, out of the set 101, a predetermined service center number to first establish a voice and data communication path over the unblocked service channel, with the cellular service provider center 105 via the radio antenna 104 and cellular base station 102, the bidirectional link 103, the MTSO 100 and the other bidirectional link 106. Once the voice and data communication path is established between the telephone set 101 and the service provider center 105, the subscriber/user can verbally, or by means of the telephone set dial, convey to an operator located at the service attendant station 108 any requested subscriber-specific information. In accordance with an illustrative embodiment, the telephone set 101 is equipped with a program activating key 112 adapted to bridge the modem 110 located within the telephone set 101, onto the then currently established voice communication path with the cellular service center 105. In turn, the operator at the attendant station 108 would bridge, via a modem, a data transmitter located at the cellular service center onto the voice communication path. The foregoing in effect couples the modem at the center 105 with the modem 110 of the mobile data telephone set 101 so that the modems operate in the data mode. Next, the service operator can remotely enter information directly into a memory circuit of the mobile data telephone set 101.

As mentioned above, the information intended to be entered and stored in the mobile data telephone set 101 is specific to the mobile subscriber owner or lessee and to the desired service for such set. In cellular mobile communication services, such information is referred to as Number Assignment Module (NAM) designation parameters. A sample of such NAM designations that can be remotely downloaded into the telephone set 101 are listed in the following table:

| | |
|---|---|
| System Identification | 00022 |
| Telephone Number | 2013866366 |
| Access Overload Class | 06 |
| Group Identification | 10 |
| Initial Paging Channel | 0334 |
| Security Lock Code | 6366 |
| Local Use Flag | 1 |
| A/B System Selection | 1 |
| Min Mark Flag | 1 |

For the above sample of NAM designation parameters, the total number of characters needed to be transmitted is approximately 30 bytes in length, with each NAM designation entry having a value in the range of 0 through 9. With the addition of a special initial character, an ending character, and a 1 byte cyclic redundancy check (CRC) coding segment, the total number of bytes is 33 or less in most cases. In accordance with a preferred embodiment, a 7-bit ASCII code is used in the transmission of the NAM designating parameters from the cellular service provider center 105 to the mobile data telephone set 101. The download sequence over a cellular voice channel begins with a start of download character "STX" (i.e., ASCII character 002 in octal code) which indicates to the software controller inside the telephone set 101 to accept the subsequent 30 bytes as NAM designation parameters. An end of download character "ETX" (i.e., ASCII character 003 in octal code) is next transmitted to indicate that the transmission of NAM parameters is now complete, to check the CRC checksum of all the digits received and to store all the NAM designation parameters in the permanent memory within the telephone set 101. A subsequent string of characters "EOT" (ASCII character 004 in octal code) is indicative that the downloading is completed, and that the mobile data telephone set may now start, or alternatively resume, cellular service operation and use.

Figure 2:
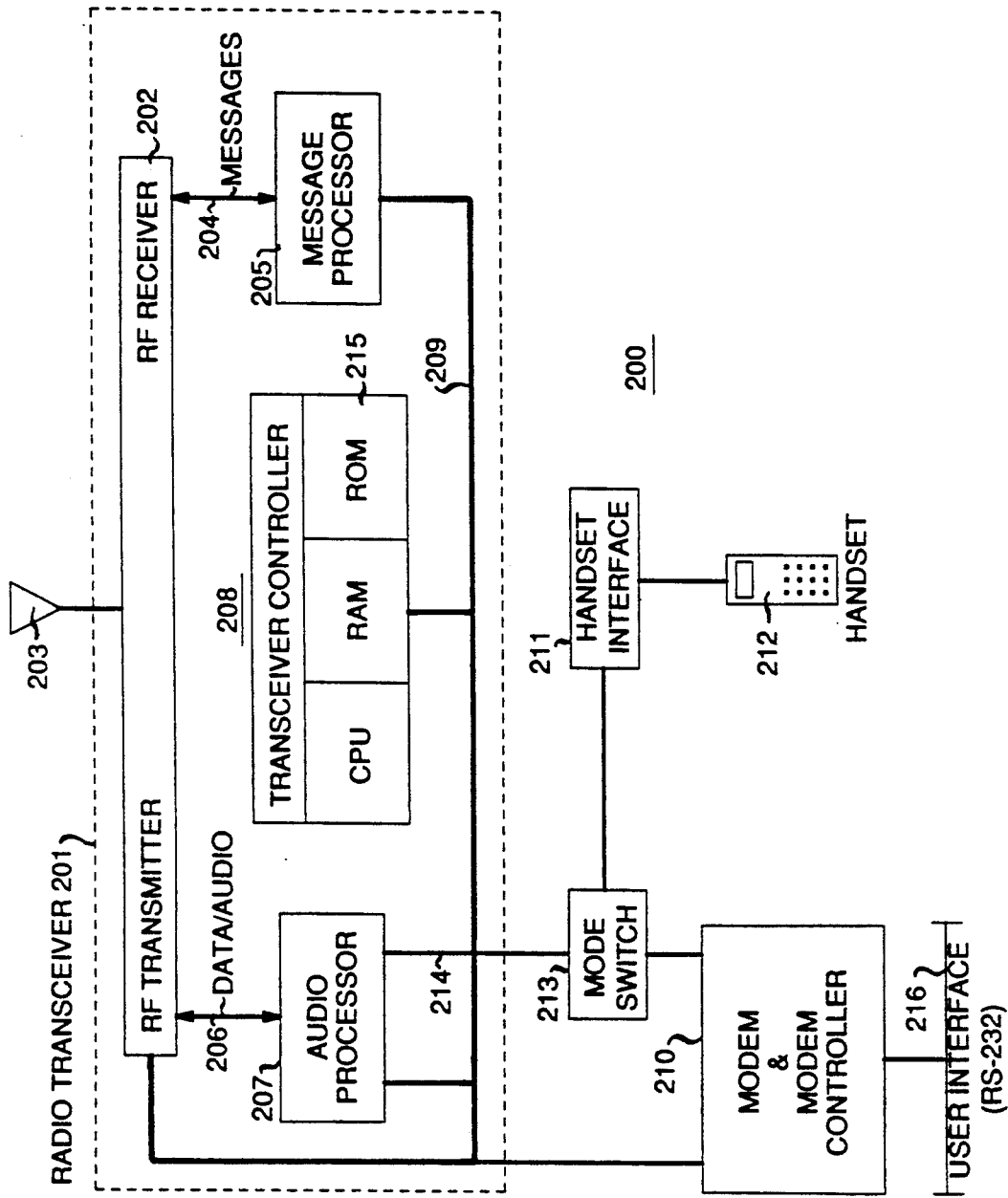
FIG. 2 is a block diagram configuration of a mobile data telephone set in accordance with a preferred embodiment of the invention.
Figure 3:
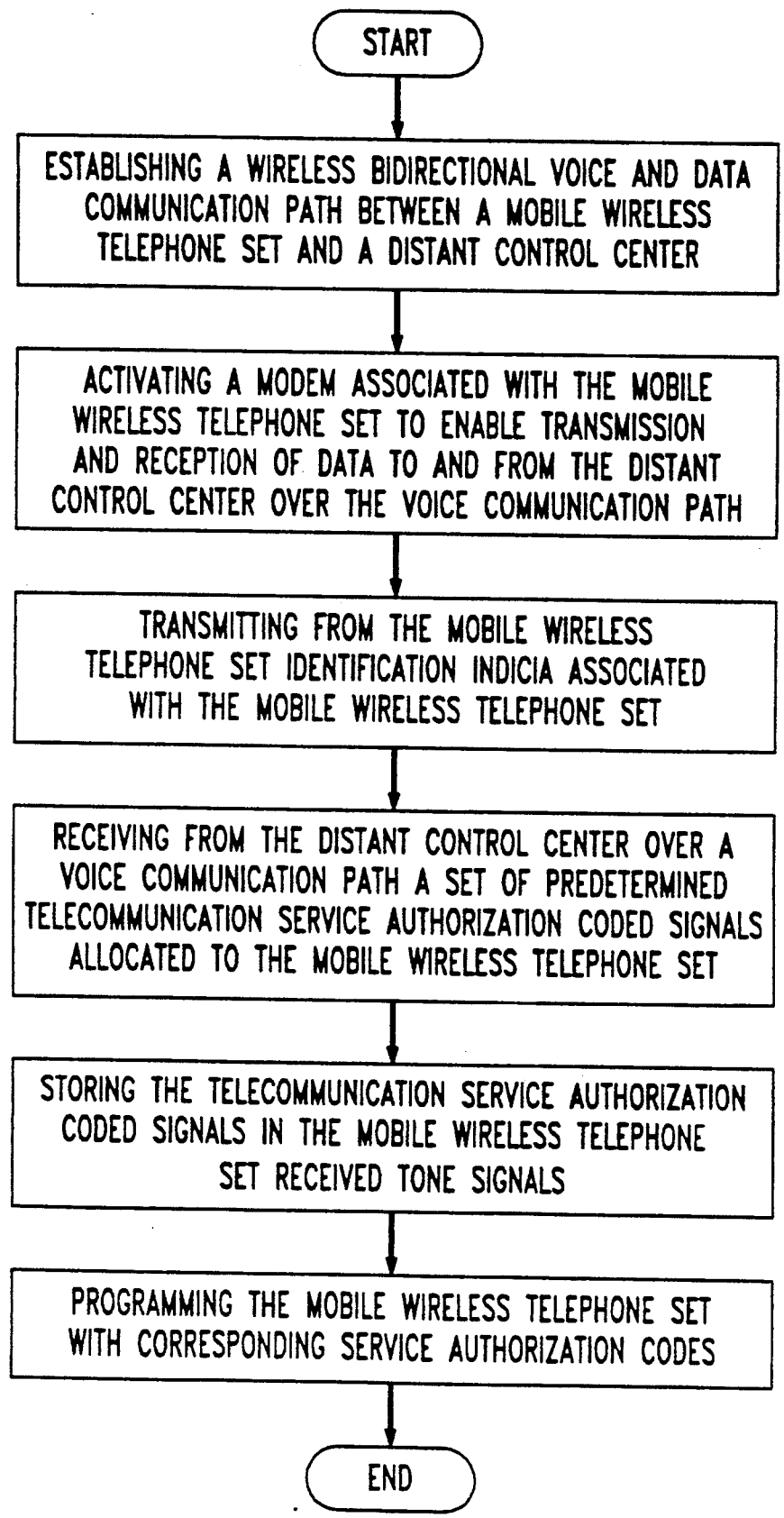
FIG. 3 is a flow diagram of a method for remotely programming a mobile data telephone set.

Referring now to FIG. 2, there is shown in functional block diagram form, a mobile data telephone set 200 in accordance with a preferred embodiment of the invention. The mobile data telephone set 200 comprises a radio transceiver portion 201 which includes a radio frequency receiver/transmitter 202 coupled to an antenna 203 and adapted to receive and transmit signals from and to a mobile base station, e.g. a mobile cell site, or another mobile telephone. Coupled to the receiver/transmitter 202, via a bidirectional message connection lead 204, is a processor 205 capable of receiving and processing system message-type signals. Also coupled to the receiver/transmitter 202, via another bidirectional lead 206, is a processor 207 adapted to process data signals as well as audio signals originating or received at the mobile data telephone 200. Audio and data signals present on lead 206 are those signals intended for and derived from the antenna 203.

Within the radio transceiver 201, a controller 208 is coupled to the message processor 205 and the audio processor 207, via a control bus 209, which is also coupled to the receiver/transmitter 202, and to a modem and modem controller circuit 210. A handset interface circuit 211 interconnects the audio processor 207 and a telephone handset 212. In accordance with one illustrative embodiment, interposed between the handset interface 211 and the radio transceiver 201 is a mode switch 213, which in turn is coupled to the modem circuit 210. During the remote programming, or NAM parameters downloading, of the telephone set 200, the mode switch 213 diverts a stream of signals received at the antenna 203 and present on output lead 214 of the audio processor 207 to the modem circuit 210. In such case, rather than receiving such signals and delivering them out to a modem user interface 216 (e.g., an EIA RS-232 port), the modem controller diverts the stream of signals, via the control bus 209, to the transceiver controller 208 where they are retained and stored within a permanent memory circuit 215.

As mentioned in connection with the above illustrative embodiment, the stream of signals comprises a STX character, approximately 30 bytes of NAM information, an ETX character and a checksum character. Upon receipt of this stream of signals, the mobile data telephone 200 is programmed to respond back to the cellular service provider center (105 in FIG. 1) by either transmitting an acknowledgement signal "ACK" (i.e., ASCII character 006 in octal code) or a "NAK" signal (i.e., ASCII character 025 in octal code) indicating that an error occurred during transmission and that the operator at the cellular service provider should reinitiate the NAM information downloading. Upon successfully completing a downloading operation, the cellular service provider center transmits a series of EOT characters which, when received at the mobile data telephone 200, cause the modem 210 and mode switch 213 to revert to a voice mode thereby interconnecting the handset 212 and its interface 211 to the audio processor 213. At this point, the operator at the cellular service provider center can verbally inform the telephone subscriber that the mobile data telephone set 200 is now fully programmed and ready to be used.

Although the present invention has been described in connection with particular embodiments thereof, additional embodiments, modifications and applications which will be apparent to those skilled in the art are included within the spirit and scope of the invention. For example, although the remote programming of a mobile data telephone is described above with reference to cellular analog FM channels, remote downloading of NAM designation parameters in Time Division Multiple Access (TDMA) systems and Code Division Multiple Access (CDMA) systems may be readily achieved based on the above description. One way of accomplishing such downloading is to send the NAM information as user data, which in essence is similar to sending data to a host computer on the public switched telephone network over a digital cellular system. Another way of achieving such NAM downloading is to first adopt a unique signaling message—similar to hand-off requests, RF power adjustments, blank/burst, etc.—which the mobile data telephone set responds to, and to have such message defined and sent out by a cell site at the request of the MTSO. Once a data path is established, the remaining operations and steps are identical to those described above in connection with an analog cellular system.

I claim:

1. A wireless remotely programmable mobile radiotelephone set in a cellular telephone system comprising:
   a transmit and receive antenna;
   a radio transceiver connected to the antenna and including transmit and receive apparatus for establishing a wireless bidirectional voice and data communication path between the wireless remotely programmable mobile radiotelephone set and a distant control center;
   an audio processor for processing received and originated voice and data signals;
   a voice handset and handset interface coupled to the audio processor;
   means for enabling a wireless remotely programmable mobile radiotelephone set owner to receive and have downloaded into the wireless remotely programmable mobile radiotelephone set, via the wireless bidirectional voice and data communication path, a set of service authorization signals, including a telephone number for the wireless remote programmable mobile radiotelephone set, enabling its operation within a cellular telephone system, by initiating a call from the wireless remotely programmable mobile radiotelephone set which is directed, over a channel unblocked to unauthorized subscribers, to a service center number at the distant control center;
   the means for enabling including:
   a modem and modem controller connected to the radio transceiver;
   a mode switch for controllably interconnecting the modem and modem controller and the voice handset and handset interface to the audio processor, and for bridging the modem onto a voice communication path;
   actuating means for selectively bridging through the mode switch the modem of the mobile radiotelephone set onto a voice communication path;
   means responsive to the actuating means for enabling the modem to receive, over the voice communication path, the set of service authorization signals transmitted from the distant control center and allocated to the wireless remotely programmable mobile radiotelephone set; and
   means for storing in the mobile data telephone set the received set of service authorization signals that are specific to the wireless remotely programmable mobile radiotelephone set owner and operative for enabling telephone service to the wireless remotely programmable mobile radiotelephone set.

2. A wireless remotely programmable mobile radiotelephone set as claimed in claim 1 wherein;
   the means for storing comprises a nonvolatile memory and the authorization signals include Number Assignment Module designation parameters.

3. A method for remotely authorizing telecommunications service to a wireless mobile radiotelephone set from a distant control center comprising the steps of:
   establishing a wireless bidirectional voice and data communication path between a wireless mobile radiotelephone set and the distant control center by initiating from a transceiver of the wireless mobile radiotelephone set a first initial telephone call to the distinct control center over a channel unblocked to unauthorized subscribers,
   entering information in response to and through the first initial telephone call into the wireless mobile radio telephone set that is specific to an owner of the wireless mobile radiotelephone set for enabling service to the wireless mobile radiotelephone set by;

activating a modem associated with the wireless mobile radio telephone set to enable transmission and reception of data to and from the distant control center over the voice communication path by using a switch to connect the modem to the transceiver on the mobile radiotelephone set and hence direct received signals to the modem;

transmitting from the wireless mobile radio telephone set identification indicia associated with the wireless mobile radio telephone set;

receiving from the distant control center over a voice communication path a set of predetermined telecommunication service authorization coded signals including a telephone number to be allocated to the wireless mobile radio telephone set;

storing the received telecommunication service authorization coded signals in the wireless mobile radiotelephone set;

programming the wireless mobile radiotelephone set with corresponding authorization codes including a telephone number operative to enable telephone service to the wireless mobile radiotelephone set.

4. A method for remotely authorizing telecommunication service to a wireless mobile radiotelephone set from a distant control center as claimed in claim 3; comprising the further steps of:

including in the telecommunication service authorization signal Number Assignment Module designation parameters.

* * * * *